(12) United States Patent
Van Ryzin et al.

(10) Patent No.: US 6,255,961 B1
(45) Date of Patent: Jul. 3, 2001

(54) TWO-WAY COMMUNICATIONS BETWEEN A REMOTE CONTROL UNIT AND ONE OR MORE DEVICES IN AN AUDIO/VISUAL ENVIRONMENT

(75) Inventors: John M. Van Ryzin, Madison; Peter Douma, Wyckoff, both of NJ (US)

(73) Assignees: Sony Corporation, Park Ridge, NJ (US); Sony Electronics, Inc., Tokyo (JP)

( * ) Notice: Subject to any disclaimer, the term of this patent is extended or adjusted under 35 U.S.C. 154(b) by 0 days.

(21) Appl. No.: 09/074,682

(22) Filed: May 8, 1998

(51) Int. Cl.[7] .................................................... H04Q 19/02
(52) U.S. Cl. .............................. 340/825.25; 340/825.69; 340/825.24; 341/176
(58) Field of Search ...................... 340/825.25, 825.24, 340/825.69; 341/176; 455/151.4, 92, 95

(56) References Cited

U.S. PATENT DOCUMENTS

| | | | |
|---|---|---|---|
| 4,817,203 | 3/1989 | Tsurumoto et al. | 455/603 |
| 4,999,622 | 3/1991 | Amano et al. . | |
| 5,363,355 | 11/1994 | Takagi | 369/32 |
| 5,410,326 * | 4/1995 | Goldstein | 348/734 |
| 5,420,573 | 5/1995 | Tanaka et al. | 340/825.24 |
| 5,488,357 | 1/1996 | Sato et al. | 340/825.25 |
| 5,532,684 * | 7/1996 | Katsu | 340/825.25 |
| 5,594,709 | 1/1997 | Nagano et al. | 369/32 |
| 5,625,608 * | 4/1997 | Grewe et al. | 369/24 |
| 5,646,608 | 7/1997 | Shintani | 340/825.25 |
| 5,822,098 * | 10/1998 | Morgaine | 359/142 |
| 5,990,803 * | 10/1998 | Park | 340/825.34 |

* cited by examiner

Primary Examiner—Michael Horabik
Assistant Examiner—Yves Dalencourt
(74) Attorney, Agent, or Firm—Reneé Michelle Larson

(57) ABSTRACT

A remote control unit in an audio/visual system has a two-way communications link with one or more audio/visual devices. The bi-directional flow of information between the remote control unit and the audio/visual device (s) provides for the creation of remote control commands that are customized based upon the characteristics of the particular A/V device being controlled by the remote control unit. The remote control unit may additionally have another two-way communications link with one or more information-providing devices, such as a personal computer capable of accessing the Internet, that can provide the remote control unit with information available outside the audio/visual environment. The bi-directional flow of information of the two-way communications links is accomplished with a two-way infra-red link or a two-way serial link.

20 Claims, 7 Drawing Sheets

TWO-WAY COMMUNICATIONS BETWEEN A REMOTE CONTROL UNIT AND ONE OR MORE DEVICES IN AN AUDIO/VISUAL ENVIRONMENT

CROSS REFERENCE TO RELATED APPLICATIONS

The subject matter of the present application is related to copending U.S. application Ser. No. 09/074,683, filed contemporaneously with this application, assigned to Sony Corporation and to Sony Electronics, which is expressly incorporated herein by reference.

FIELD OF THE INVENTION

This invention relates generally to communications of a remote control unit in an audio/visual environment, and more particularly to two-way communications between a remote control unit and one or more devices in an audio/visual environment.

BACKGROUND OF THE INVENTION

Remote control units are commonly used in audio/visual (A/V) environments to control various audio/visual equipment and devices. Audio/visual equipment includes, but is not limited to, the following: compact disc (CD) players, VCRs, televisions (TVs), digital visual discs (DVDs), and stereo components such as stereo receivers. Communications between a remote control unit and the audio/visual equipment which it controls have typically been one-way from the remote control unit to the A/V equipment, with the audio/visual equipment receiving commands from the remote control unit and the audio/visual equipment acting in accordance with these commands.

The current state of the art with regard to communications between a remote control unit and audio/visual equipment is illustrated in the block diagram 10 of FIG. 1. In FIG. 1, any number N of audio/visual equipment, such as A/V Device1 of Block 12, A/V Device 2 of Block 14, . . . A/V DeviceN of Block 16, may be controlled by a remote control unit, shown as Remote Control of Block 20. The Remote Control controls one or more of the audio/visual equipment by sending out commands to which the targeted audio/visual equipment responds. Remote Control 20 and a targeted A/V device communicate via a one-way communications link 18, which is typically infra-red. Communications between one or more A/V Devices are typically accomplished by a two-way serial link 22, such as the S-Link known in the industry.

One-way communications between the remote control unit and audio/visual equipment, while providing for the transmission of information in the form of control messages from the remote control unit to the audio/visual equipment, do not provide for the flow of information in the opposite direction from the audio/visual equipment to the remote control unit. As such it is not currently possible to pass information in a two-way, bi-directional manner between a remote control unit and A/V equipment.

The limitation of not being able to achieve bi-directional information exchange necessarily limits the usefulness of the remote control unit. Because information from the A/V equipment being controlled is not made available to the remote control, the commands generated by the remote control must be generic in nature, with no opportunity for customization of remote control commands based upon the characteristics of the particular A/V equipment being controlled. For instance, with existing remote control technology, it is not possible to transmit the table of contents (TOC) of a music CD in a CD player from the CD player to the remote control unit in order to create customized playlists based upon the TOC for that particular music CD in the CD player at the time.

In light of the above discussion, it is clear that there exists a need in the art to be able to have two-way communications between a remote control unit and various A/V equipment being controlled by the remote control unit. Such a communications capability would greatly add to the usefulness and flexibility of remote control units. Many new remote control features, not previously contemplated, could then be developed and implemented.

SUMMARY OF THE INVENTION

It is accordingly an object of the invention to have two-way communications between a remote control unit and various A/V equipment being controlled by the remote control unit.

It is further an object of the invention that such two-communications between the remote control unit and A/V equipment will facilitate the development and implementation of various new remote control features that may be customized according to the characteristics of the particular A/V equipment to be controlled.

Therefore, according to the present invention, a remote control unit has a two-way communications link with one or more audio/visual devices in an audio/visual system, thereby providing for the bi-directional exchange of information between the remote control unit and the one or more audio/visual devices. The remote control unit may also have a two-way communications link with an information-providing device, such as a personal computer, in order that the remote control unit have access to information external to the audio/visual system, such as information on the Internet. The two-way communications link may be an infra-red communications link or a serial communications link.

The bi-directional flow of information to and from the remote control unit allows for the creation of customized remote control commands based upon characteristics of a particular A/V device being controlled by the remote control unit and external information provided to the remote control unit through the information-providing device. Using the present invention, the creation of many new remote control features is possible.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention provides for the bi-directional exchange of information between a remote control unit and one or more devices in an audio/visual environment. Using the present invention, two-way communications between the remote control unit and an audio/visual device, as well as between the remote control unit and a personal computer (PC), are possible. This bi-directional flow of information allows for the creation of customized remote control commands based upon characteristics of the particular A/V device being controlled by the remote control unit or other device in communication with the remote control unit. The communications capability of the present invention greatly adds to the usefulness and flexibility of remote control units in A/V environments, making the creation of many new remote control features, not previously contemplated, possible. The bi-directional flow of information is facilitated by a two-way infra-red (IR) link or a two-way serial link, such as S-Link, between the remote control unit and the A/V device(s) and/or PC.

Figure 1:
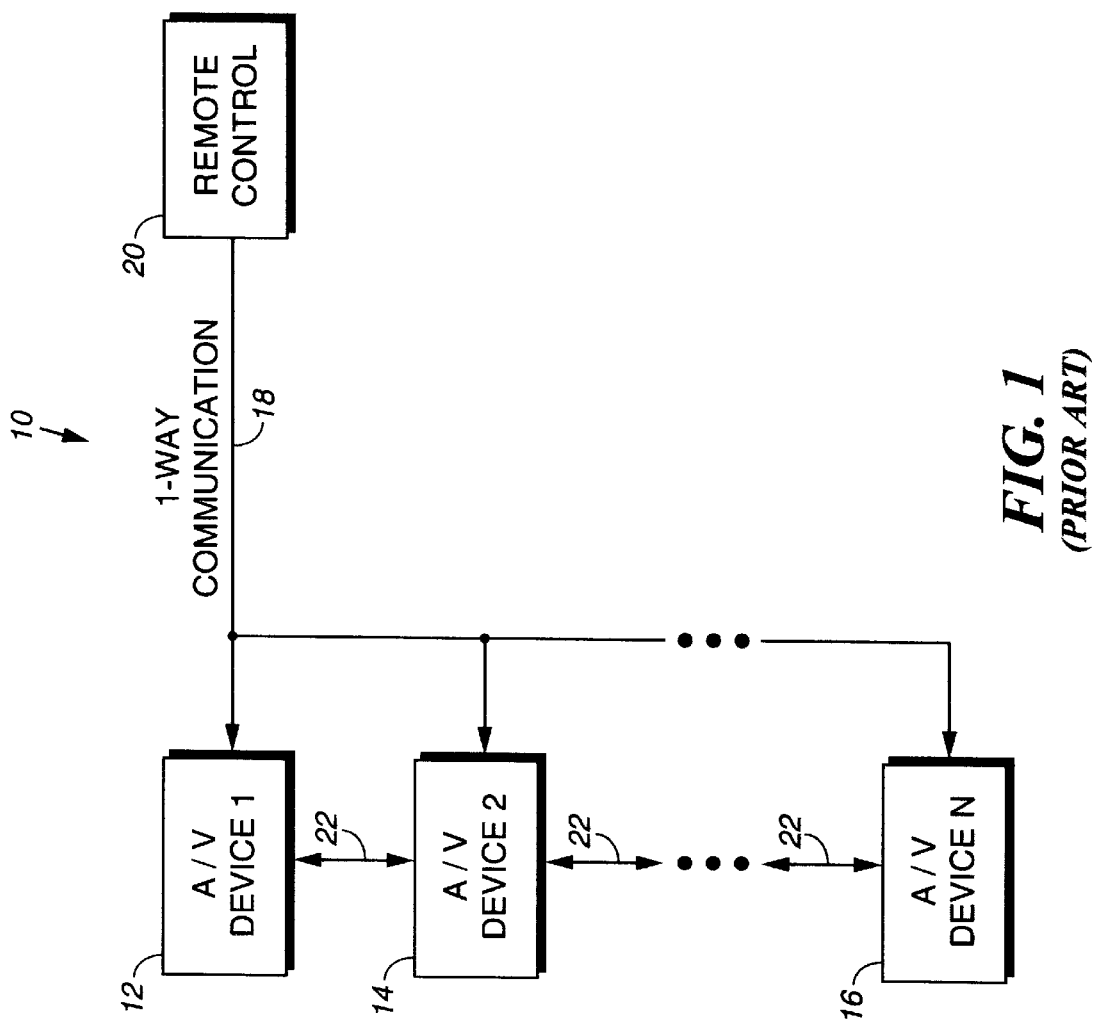
FIG. 1 is a block diagram of communications between a remote control unit and audio/visual devices, according to the prior art.
Figure 2:
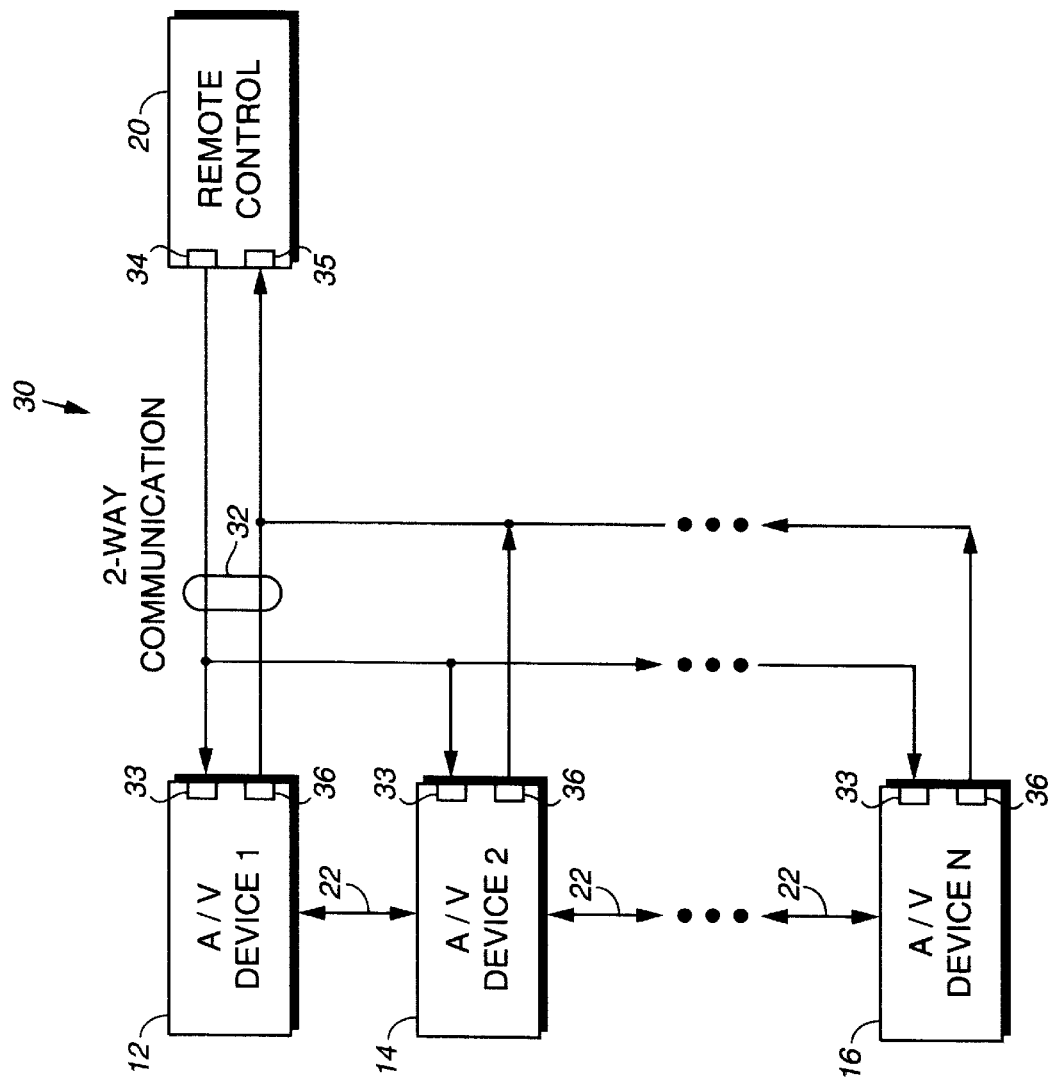
FIG. 2 is a block diagram of bi-directional communications between a remote control unit and various audio/visual devices, according to the present invention.

Referring to FIG. 2, a block diagram 30 of bi-directional communications between a remote control unit and various audio/visual equipment, according to the present invention, is illustrated. The bi-directional communications link 32 between remote control unit 20 and A/V devices 12, 14, 16 provides for a two-way information exchange between remote control unit 20 and A/V devices 12, 14, 16. The flow of information from the A/V devices to the remote control unit is novel in the art and allows for the creation of customized remote control commands based upon the characteristics of the A/V device to be controlled.

The bi-directional communications link 32 between remote control unit 20 and A/V devices 12, 14, 16 is accomplished by either a two-way infra-red link or a two-way serial link, such as S-Link, between the remote control unit and the A/V device(s). The infra-red link is preferred over the serial link because of the flexibility it provides. An infra-red link does not require any physical contact or "docking" between the remote control unit and the A/V devices. In addition to the infra-red receiver already in place in the A/V devices 12, 14, 16 at Blocks 33 and the infra-red transmitter already in place in remote control unit 20 at Block 34, the IR embodiment of the present invention requires that an infra-red receiver be placed in the remote control unit 20 at Block 35. A corresponding infra-red transmitter would be placed in the audio/visual equipment 12, 14, 16 at Block 36.

Software or firmware would be written for the remote control unit 20 and the A/V devices 12, 14, 16 to enable them to communicate in a bi-directional fashion. Additional software required in the remote control unit would relate each button or sequence of buttons on the remote control unit to a corresponding command code, thereby allowing requests received from the audio/visual equipment to be carried out. And, as known in the art, software would be required in the audio/visual equipment in order to implement commands received from the remote control unit.

Infra-red communications could be replaced with a two-way serial link, such as S-Link, to provide bi-directional communications between the remote control unit 20 and the A/V devices 12, 14, 16. However, this would require that the remote control unit be physically "docked" to the audio/visual equipment while the remote control is receiving information from the audio-visual equipment and removed from the audio/visual equipment only after the information is received by the remote control unit. For instance, an S-Link port could be placed on the remote control 20 at Block 35. This would allow for a reliable hard-wired connection to Block 36 of an A/V device 12, 14, or 16. The two-way serial link, while workable as a means for accomplishing two-way communications between the remote control and the audio/visual equipment, provides less flexibility than does the approach using infra-red technology.

Two-way communications between A/V devices and a remote control unit allows for the development of many new remote control features. Examples of such features, which assume that the remote control unit has an alphanumeric display and processor, will now be discussed. First, consider bi-directional communications between the remote control unit and a CD player. The table of contents (TOC) of a music CD in a CD player could be transmitted from the CD player to the remote control unit. This information would allow the user to create track playlists of desired tracks and "don't play" lists of non-desired tracks, all on the remote control unit using the TOC information received from the CD player. Of course, the playlists that could be created would be customized to fit the individual tastes of the user.

A second example of a new remote control feature that utilizes the bi-directional flow of information of the present invention is that CD "text ready" strings could be sent from the CD player to the remote control unit. The text string could be displayed on the remote control display, as well as on the CD player, thereby enabling the user to select music by name on the remote control unit. This remote control feature would overcome the difficulty of seeing a CD "text ready" on the CD player from a distance, such as across a living room.

A third example of a new remote control feature is to "echo" back VCR display data, displayed on a VCR, from the VCR back to the remote control unit and display this data on the display (screen) of the remote control unit. A decided advantage of this feature is that typically it is much easier to read the VCR display data on the remote control unit, typically held in the hand of the user, than on the VCR device itself due to the position of the user vis-à-vis the VCR and the remote control unit. This feature would be especially handy when using the remote control unit to program the VCR, such as when programming the VCR to record future programs, for instance.

With the present invention, it is not only possible to have bi-directional communications between the remote control unit and A/V devices in an A/V system but to also have bi-directional communications between the remote control unit and other, information-providing equipment or devices, such as personal computers (PCs), capable of operating cooperatively in the A/V environment. Communications between the remote control unit and such information-providing equipment or devices allows additional information to be accessed and used in the A/V system. For instance, communications to and from a PC provides the user with access to the wealth of pertinent information to be found on the Internet. Such bi-directional communications may also be accomplished by either infra-red (IR) or a two-way serial connection, as previously discussed, between the remote control unit and the information-providing equipment or device.

Figure 3:
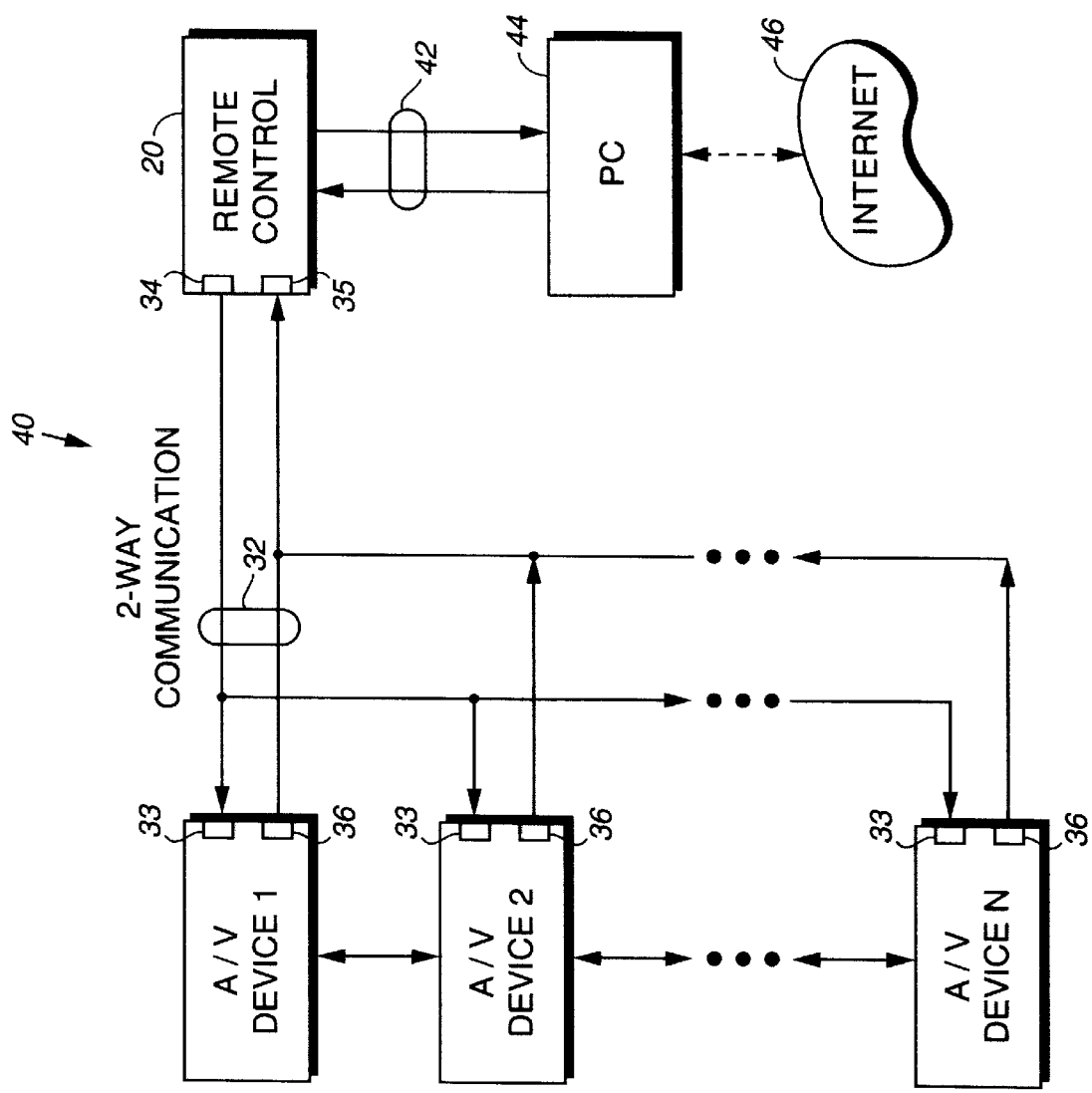
FIG. 3 is a block diagram of bi-directional communications between a remote control unit and a personal computer (PC), as well as between the remote control unit and various audio/visual devices, according to the present invention.

Referring to FIG. 3, a block diagram 40 of bi-directional communications between the remote control unit and an information-providing device, as well as between the remote control unit and the A/V devices, according to the present invention, is shown. The communications between the remote control unit 20 and PC 44 is accomplished by a two-way communications link 42, which may be either an infra-red link or a serial two-way link. PC 44 would have either an infra-red port or a serial port, depending upon which type of communications link is used. Software or firmware would be written to enable the remote control unit and the PC to communicate in a bi-directional fashion.

Infra-red communications provides a reliable, flexible communications link between the remote control unit 20 and PC 44. Alternately, infra-red communications could be replaced with an S-Link two-way serial link. Thus, an S-Link port could be placed on the remote control unit and this would allow for a reliable hard-wired connection to PC 44. The bi-directional serial link approach, however, would require that the remote control unit be "docked" to the PC to receive or send information and then removed from the PC after the transfer of information is complete. Thus, while workable as a means for accomplishing two-way communications between the remote control and the PC, this approach provides less flexibility than does infra-red technology.

A primary benefit of having the remote control unit 20 communicate with PC 44 in a two-way fashion is that the PC is a very useful tool for controlling and programming the remote control unit 20. A further important benefit of having two-way communications between the remote control unit and the PC is that access to the Internet 46 (world wide web), and thus the wealth of information available on the Internet, is provided. Information on the Internet that may be of interest to a user of an A/V system includes TV listings with VCR+ codes and information about music CDs in the form of the CD TOC, a database containing such information as the number of tracks and length of each track on the CD. PC software would allow such databases to be browsed and pertinent information to be communicated from the PC to the remote control unit.

Two-way communications between A/V devices 12, 14, 16 and remote control unit 20 and between remote control unit 20 and PC 44 facilitates the development of many new and useful remote control features. Examples of such features follow and assume that the remote control unit possesses an alphanumeric display and processor. First, the TOC of a CD could be sent to the PC via a PC infra-red port, for instance. The PC could retrieve title and track text strings from a server database and send the text back into the remote control unit. The remote control unit would then relay this text data to the CD player's CD description display memory. This would prevent non-"text ready" CD's from behaving as if they were in fact text ready. Second, the user could browse a web page television guide of the Internet on the PC and then select shows to be recorded. The PC software would send the time codes of the shows to be recorded to the remote control unit. The user would then take the remote control unit with the record information into the living room, assuming the PC is not in the living room where the VCR is located, and press the record button on the remote control unit, thereby causing the record time codes gleaned from the Internet TV guide to be sent to the VCR.

Figure 4:
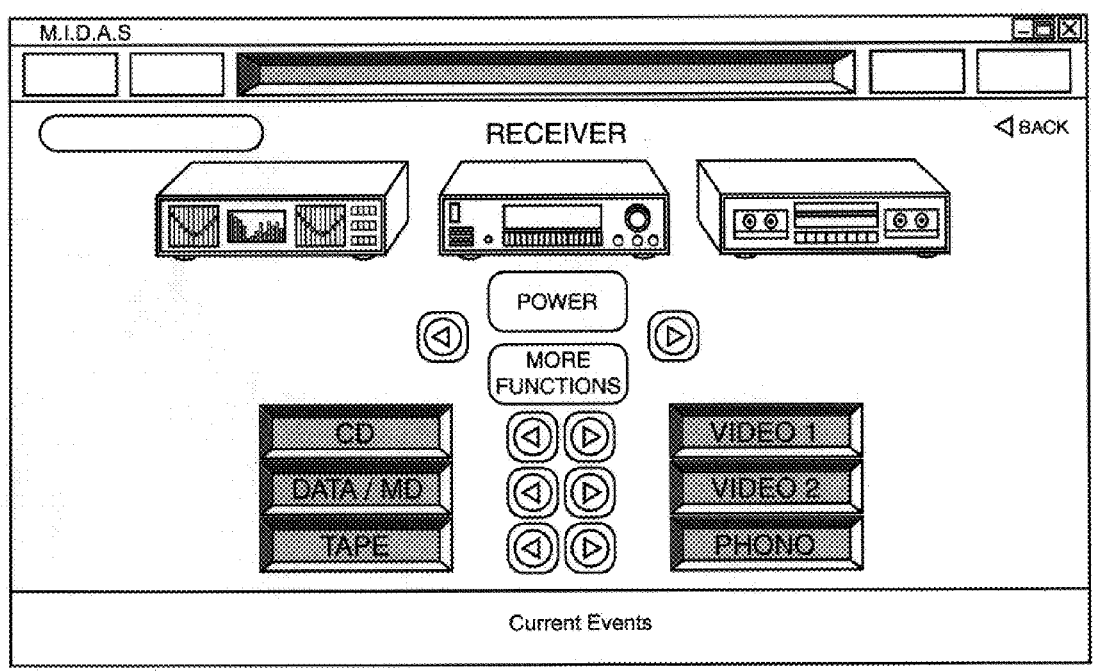
FIG. 4 is a graphical user interface representation of an audio/visual device as it might appear on the display of a personal computer, according to the present invention.

The usefulness he present invention, especially when used in conjunction with a PC capable of accessing Internet information, is illustrated in FIGS. 4–7. Referring to FIG. 4, a graphical user interface (GUI) representation of an audio/visual device, in this case a receiver, on the display screen of a PC is shown. The information about the receiver is provided to the remote control unit over two-way communications link 32 to port 35 of the remote control unit 20 and then from the remote control unit 20 to PC 44 over two-way communications link 42. The receiver has a number of A/V functions, including a CD player, a digital audio tape/mini disk (DAT/MD) player, a tape player, video1/video2, and phono. Of course, a receiver is just one of many types of A/V devices that may be used and therefore is shown here simply for illustrative purposes. In this illustration, the CD function is selected by the user.

Figure 5:
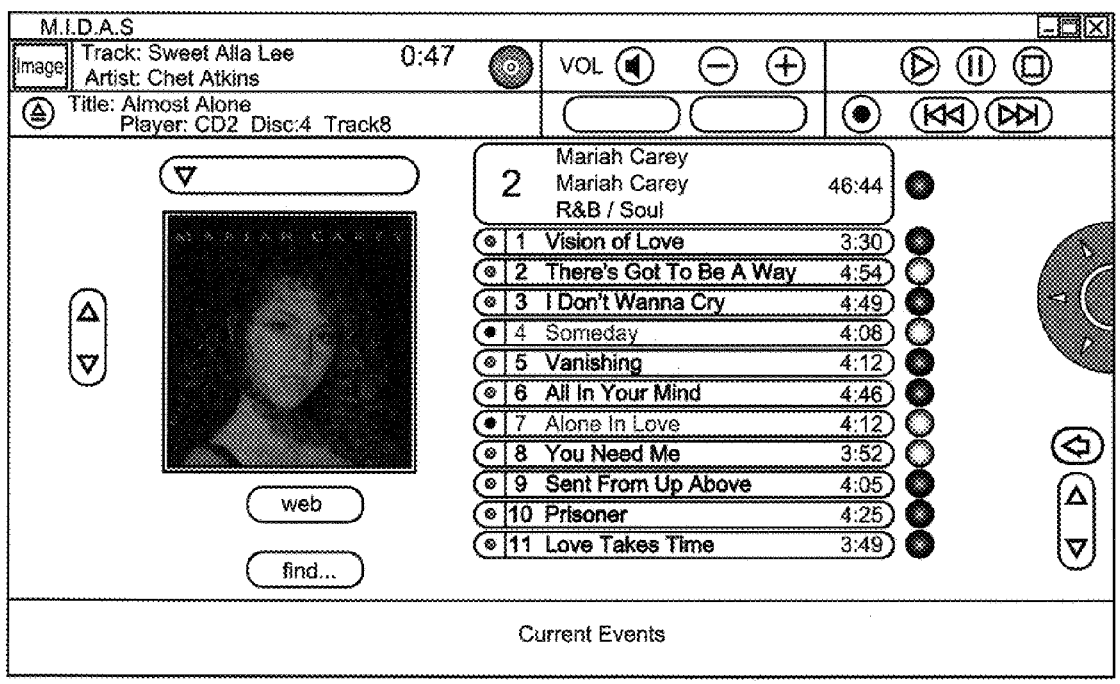
FIG. 5 is a graphical user interface representation of the table of contents of a music compact disc as it might appear on the display of a personal computer, according to the present invention.
Figure 6:
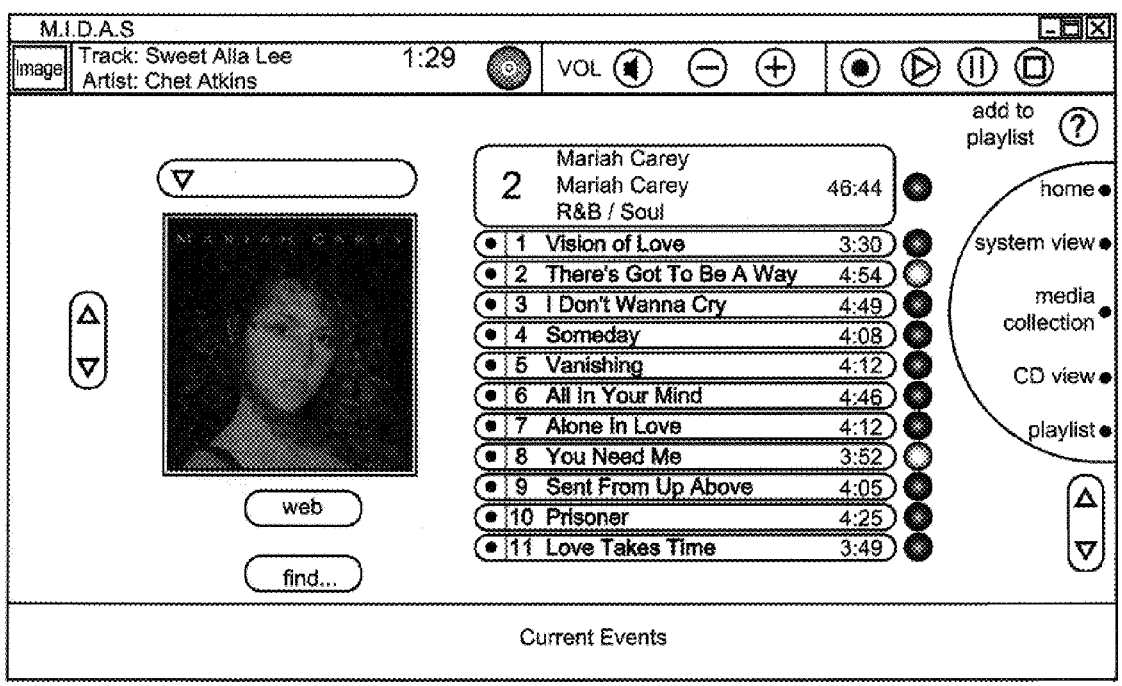
FIG. 6 is a graphical user interface representation of the various menu options available to the user as it might appear on the display of a personal computer to exercise the present invention in connection with a music compact disc present in a compact disc player, according to the present invention.
Figure 7:
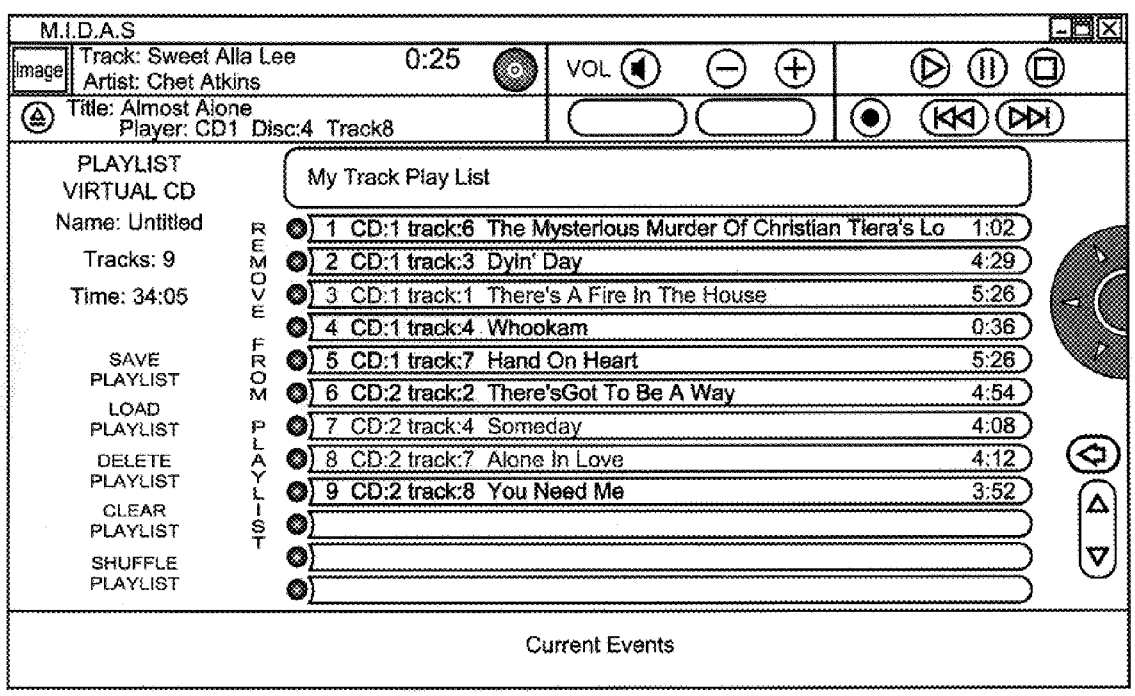
FIG. 7 is a graphical user interface representation of options available to the user to create, modify, save, delete, load, or shuffle a playlist of a "virtual CD", as it might appear on the display of a personal computer, according to the present invention.

Next, as shown in FIG. 5, the user may access the TOC of a CD in the CD player; in this case, the TOC is for a Mariah Carey music CD. The TOC shows the number of tracks on the CD, in this example 11, the names of each of the tracks, and the duration of each track and the total playing time for the CD (46 minutes, 44 seconds in this case). Selecting the appropriate icon on the right hand side of the screen opens a menu from which the option "playlist" may be chosen, as shown in FIG. 6. Choosing the playlist option takes the user to FIG. 7 where a GUI which the user may use to create a customized playlist, called a "virtual CD", is illustrated. The GUI of FIG. 7 provides many options to the user. The user may choose to remove one or more tracks from the playlist, save the playlist, load the playlist so that it may be played by the CD player function of the receiver, delete a playlist, clear a playlist, or shuffle the playlist to create a random ordering of the tracks of the playlist. As shown in FIGS. 5 and 6, the user is able to easily access the Internet by simply selecting the "web" option. As shown at the bottom of FIGS. 4–7, information from the Internet, in the form of a scrolling message, is part of the GUI on the PC.

While the invention has been particularly shown and described with reference to a preferred embodiment, it will be understood by those skilled in the art that various changes in form and detail may be made therein without departing from the spirit and scope of the invention.

What is claimed is:

1. An audio/visual system that provides for the bi-directional exchange of information, comprising:
   an audio/visual device;
   a remote control unit for controlling the audio/visual device;
   a first two-way communications link between the remote control unit and the audio/visual device that provides for information to be transmitted by the remote control unit and received by the audio/visual device and for information to be transmitted by the audio/visual device and received by the remote control unit;
   an information-providing device capable of accessing information external to the audio/visual system; and
   a second two-way communications link between the remote control unit and the information-providing device that provides for information to be transmitted by the remote control unit and received by the information-providing device and for information to be transmitted by the information-providing device and received by the remote control unit.

2. The system of claim 1, wherein the information-providing device is a personal computer capable of accessing information from the Internet and transmitting information from the Internet to the remote control unit.

3. The system of claim 1, wherein the second two-way communications link between the remote control unit and the information-providing device is an infra-red communications link and wherein the remote control unit and the information-providing device each have an infra-red receiver and an infra-red transmitter.

4. The system of claim 1, wherein the first two-way communications link between the remote control unit and the audio/visual device is a first infra-red communications link and the second two-way communications link between the remote control unit and the information-providing device is a second infra-red communications link and wherein the remote control unit, the audio/visual device, and the information-providing device each have an infra-red transmitter and an infra-red receiver.

5. The system of claim 1, wherein the second two-way communications link between the remote control unit and the information-providing device is a serial communications link and wherein the remote control unit and the information-providing device each have a serial port.

6. The system of claim 1, wherein the remote control unit and the information-providing device contain software that enables the second two-way communications link between the remote control unit and the information-providing device.

7. The system of claim 1, wherein information transmitted by the audio/visual device and received by the remote control unit over the first two-way communications link is displayed on a display of the remote control unit.

8. The system of claim 1, wherein information transmitted by the information-providing device and received by the remote control unit over the second two-way communications link is displayed on a display of the remote control unit.

9. A remote control unit capable of bi-directional exchange of information with one or more audio/visual devices in an audio/visual system and of bi-directional exchange of information with an information-providing device capable of accessing information external to the audio/visual system, wherein the remote control unit has a first port of a first two-way communications link for transmitting information to the one or more audio/visual devices, a second port of the first two-way communications link for receiving information from the one or more audio/visual devices, a first port of a second two-way communications link for transmitting information to the information-providing device, and a second port of the second two-way communications link for receiving information from the information-providing device.

10. The remote control unit of claim 9, wherein the information-providing device is a personal computer capable of accessing information from the Internet and transmitting information from the Internet to the remote control unit.

11. The remote control unit of claim 9, wherein the first two-way communications link between the remote control unit and the one or more audio/visual devices is an infra-red communications link.

12. The remote control unit of claim 9, wherein the second two-way communications link between the remote control unit and the information-providing device is an infra-red communications link.

13. The remote control unit of claim 9, wherein the first two-way communications link between the remote control unit and the one or more audio/visual devices is a serial communications link.

14. The remote control unit of claim 9, wherein the second two-way communications link between the remote control unit and the information-providing device is a serial communications link.

15. The remote control unit of claim 9, wherein the remote control unit contains contain software that enables the first two-way communications link between the remote control unit and the one or more audio/visual devices and the second two-way communications link between the remote control unit and the information-providing device.

16. The remote control unit of claim 9, wherein information received by the remote control unit from the one or more audio/visual devices or from the information-providing device is displayed on a display of the remote control unit.

17. A method for the bi-directional exchange of information between a remote control unit and one or more audio/visual devices and between the remote control unit and an information-providing device of an audio/visual system capable of accessing information external to the audio/visual system, comprising the steps of:

establishing a first two-way communications link between the remote control unit and the one or more audio/visual devices;

establishing a second two-way communications link between the remote control unit and the information-providing device;

transmitting information between the remote control unit and the one or more audio/visual devices over the first two-way communications link;

utilizing information transmitted by the one or more audio/visual devices over the first two-way communications link to the remote control unit to develop one or more control features of the remote control unit;

the information-providing device accessing information external to the audio/visual system;

transmitting the information accessed by the information-providing device external to the audio/visual system between the remote control unit and the information-providing device over the second two-way communications link; and utilizing information transmitted by the information-providing device over the second two-way communications link to the remote control unit to develop the one or more control features of the remote control unit.

18. The method of claim 17, comprising the further step of:

displaying information received by the remote control unit over the second two-way communications link from the information-providing device on a display of the remote control unit.

19. The audio/visual system of claim 1, wherein one or more remote control features are developed with the information transmitted by the audio/visual device and received by the remote control unit over the two-way communications link between the remote control unit and the audio/visual device.

20. The remote control unit of claim 9, wherein one or more remote control features are developed with information transmitted by the one or more audio/visual devices and received by the remote control unit over the two-way communications link between the remote control unit and the one or more audio/visual devices.

* * * * *